US012436501B2

(12) United States Patent
Kobayashi et al.

(10) Patent No.: US 12,436,501 B2
(45) Date of Patent: Oct. 7, 2025

(54) SOLAR WATCH

(71) Applicant: SEIKO EPSON CORPORATION, Tokyo (JP)

(72) Inventors: Atsushi Kobayashi, Shiojiri (JP); Shoki Mukaide, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 295 days.

(21) Appl. No.: 18/183,378

(22) Filed: Mar. 14, 2023

(65) Prior Publication Data

US 2023/0297030 A1 Sep. 21, 2023

(30) Foreign Application Priority Data

Mar. 15, 2022 (JP) ................................ 2022-039988

(51) Int. Cl.
*G04B 19/12* (2006.01)
*G04B 19/06* (2006.01)

(52) U.S. Cl.
CPC ........... *G04B 19/12* (2013.01); *G04B 19/065* (2013.01)

(58) Field of Classification Search
None
See application file for complete search history.

(56) References Cited

U.S. PATENT DOCUMENTS 8,758,884 B2 * 6/2014 Hiroe ..................... G04B 19/10 368/239
2014/0232603 A1 * 8/2014 Fujisawa ................ G04R 60/12 343/702
2021/0026306 A1 * 1/2021 Hasegawa .............. G04C 3/005

FOREIGN PATENT DOCUMENTS

JP 2011-174948 A 9/2011
JP 4804047 B2 * 10/2011 ............. G04B 19/06
JP 2012122808 A * 6/2012 ............. G04B 19/06

* cited by examiner

*Primary Examiner* — Regis J Betsch
*Assistant Examiner* — Michael James Walker
(74) *Attorney, Agent, or Firm* — Harness, Dickey & Pierce, P.L.C.

(57) ABSTRACT

A solar watch includes a dial at a solar cell, wherein a decorative member is provided at the dial, the dial includes a subdial, a transflective plate is provided between the solar cell and the dial, the transflective plate has a first region selectively provided at a portion overlapping the subdial, a second region provided at a portion overlapping an outer periphery of the dial, and a third region coupling the first region and the second region, and the third region is selectively provided at a portion overlapping the decorative member.

7 Claims, 11 Drawing Sheets

100

SOLAR WATCH

The present application is based on, and claims priority from JP Application Serial Number 2022-039988, filed Mar. 15, 2022, the disclosure of which is hereby incorporated by reference herein in its entirety.

BACKGROUND

1. Technical Field

The present disclosure relates to a solar watch.

2. Related Art

A solar watch having a solar cell under a dial is known. For example, JP-A-2011-174948 discloses a solar watch in which a transflective plate and a light-transmissive dial including a prism on its lower surface are superposed and arranged on top of a solar cell. According to JP-A-2011-174948, a dark purple color tone of the solar cell is eliminated without interfering with the power generation of the solar cell and furthermore the light-transmissive dial appears white and the display of the dial for the watch is seen bright and clear. The solar watch is thought to be a three-hand type analog watch from the mode of FIG. 1 or the like of JP-A-2011-174948.

On the other hand, a multi-axis watch that includes a subdial having a chronograph minute hand and a chronograph hour hand within a main dial for displaying time like a chronograph watch is also known. In such a multi-axis watch, a plurality of small circular subdials are laid out within a circular main dial. In multi-axis watches, there is a need to selectively change the color of the subdials to improve design.

Here, to improve the design of the multi-axis watch, it is conceivable to provide a transflective plate only on the subdials, but JP-A-2011-174948 does not contain any description or suggestion regarding subdials. It is also conceivable to attach a transflective plate only to the subdial portions, but there is a risk of a bonding member such as an adhesive or a double-sided tape becoming visible, which could ruin the appearance. In addition, when there are a plurality of subdials, it is necessary to attach a transflective plate to each subdial, which degrades assemblability.

That is, there has been a demand for a solar watch including a dial with excellent assemblability and light transmission and improved design.

SUMMARY

A solar watch according to an aspect of the present disclosure includes a dial at a solar cell, wherein a decorative member is provided at the dial, the dial includes a subdial, a transflective plate is provided between the solar cell and the dial, the transflective plate has a first region selectively provided at a portion overlapping the subdial, a second region provided at a portion overlapping an outer periphery of the dial, and a third region coupling the first region and the second region, and the third region is selectively provided at a portion overlapping the decorative member.

DESCRIPTION OF EXEMPLARY EMBODIMENTS

First Embodiment

Overview of Watch

Figure 1:
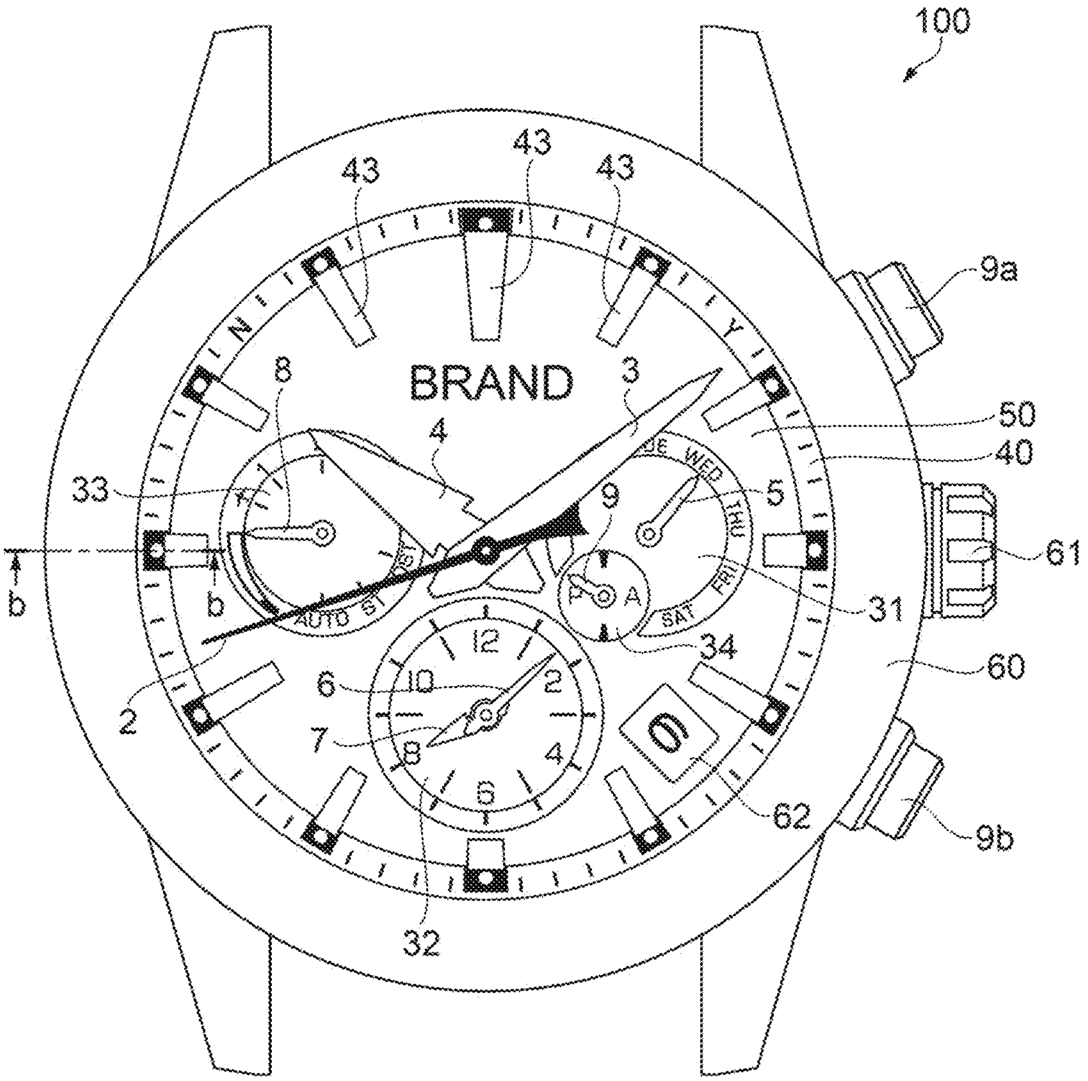
FIG. 1 is a front view of a watch according to a first embodiment.

FIG. 1 is a front view of a watch.

Embodiments of the present disclosure will be described below with reference to the drawings.

As shown in FIG. 1, a watch 100 according to a first embodiment includes subdials 31, 32, and 33, which are three small dials, on a dial 50 having a second hand 2, a minute hand 3, and an hour hand 4 and is a multi-axis solar analog watch having a solar panel on the back of the dial 50. The dial 50 is also called a main dial. The dial 50 has a circular shape and the outer periphery thereof is surrounded by a dial ring 40. A crown 61 is provided on the 3 o'clock side of the watch 100. An operation button **9*a* is provided on the 2 o'clock side of the watch 100 and an operation button 9*b* is provided on the 4 o'clock side. Various functions of the watch 100 are performed by operating the crown 61 and the operation buttons 9*a* and 9*b*. The side from which the user views the dial is the top and the side where the watch 100 touches the user's arm when the user wears the watch 100** is the bottom.

The subdial 31 is provided on the 3 o'clock side of the dial 50. The subdial 31 is a day meter and has a day hand 5 that indicates the day of the week.

The subdial 32 is provided on the 6 o'clock side of the dial 50. The subdial 32 is a 12-hour small watch and has a minute hand 6 and an hour hand 7.

A subdial 34 smaller than the subdial 31 is provided between the subdials 31 and 32. The subdial 34 has an AMPM hand 9 that indicates am/pm of the time indicated by the subdial 32. The subdial 34 is substantially integrated with the subdial 31 and provided as a part of the subdial 31.

A date window 62 for displaying the date is provided at the 4:30 position on the dial 50.

The subdial 33 is provided on the 9 o'clock side of the dial 50. The subdial 33 is an indicator indicating various states such as remaining energy and has an indicator hand 8. The functions assigned to the subdials 31, 32, and 33 are not limited to those described above and may be, for example, a second counter, a chronograph minute counter, or a 24-hour watch. Also, the number of subdials is not limited to three and one or more subdials may be provided.

Configuration of Dial

Figure 2:
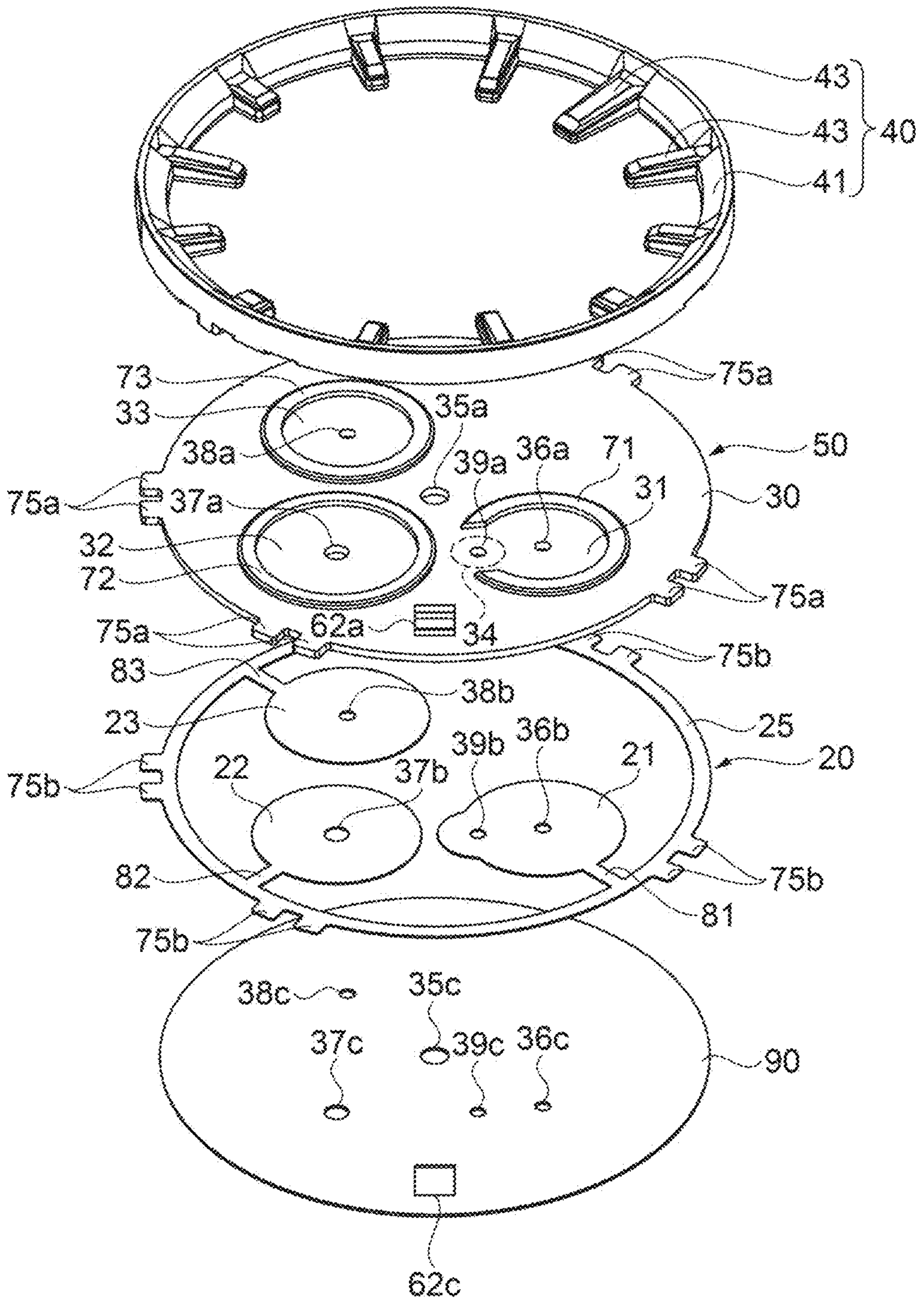
FIG. 2 is an exploded perspective view of parts around a dial.
Figure 3:
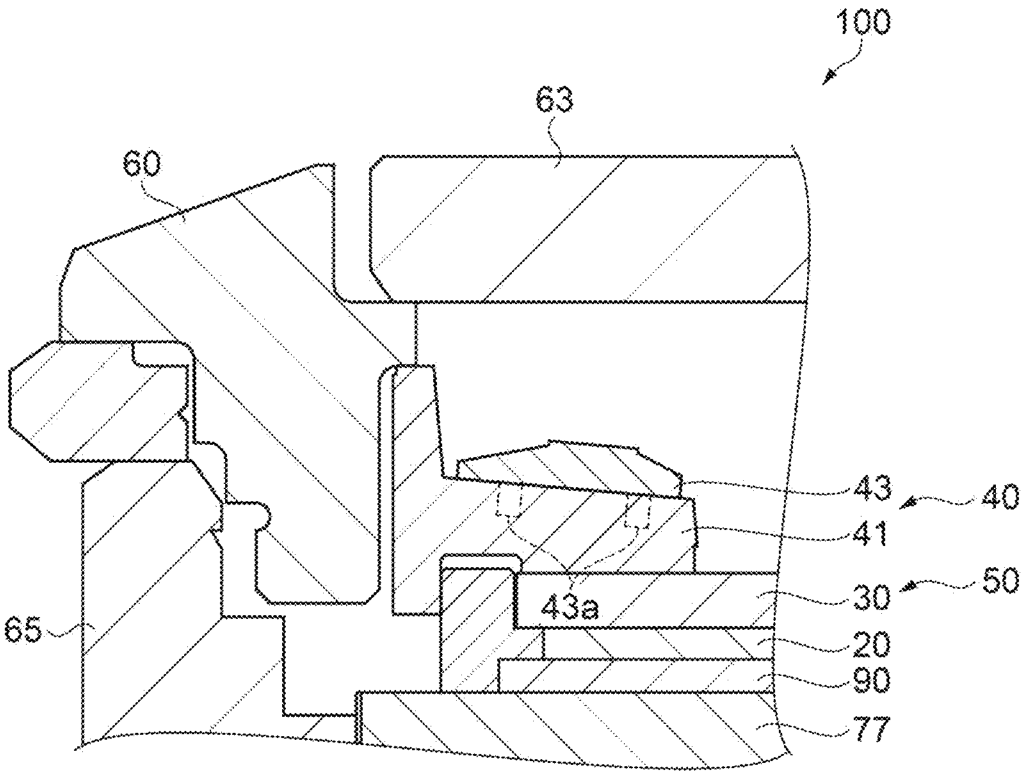
FIG. 3 is a cross-sectional view taken along line b-b of FIG. 1.

FIG. 2 is an exploded perspective view of parts around the dial. FIG. 3 is a cross-sectional view taken along line b-b of FIG. 1. Here, the configuration of the dial 50 and parts around it will be described.

As shown in FIG. 3, an internal structure of the watch 100 has a configuration with a solar cell 90, a transflective plate 20, the dial 50, and the dial ring 40 stacked on top of a movement 77. As shown in FIG. 2, the dial 50 includes three small circular subdials 31, 32 and 33 on a circular translucent substrate 30.

In a preferred example, the substrate 30 is a transparent plate made by injection molding a polycarbonate resin. The material of the substrate 30 is not limited to this and may be any translucent resin such as, for example, an acrylic resin or a polystyrene resin. Also, the substrate 30 may be colored with a transparent color. A resin material may be colored with a translucent color as the transparent color or the transparent substrate 30 may be coated with a transparent color. This can improve the design of the dial 50. For example, coating the main dial portion other than the subdials with a light black color can make the color of the solar cell 90 (dark purple) conspicuous. Here, the subdials are not color-coated and thus portions of the transparent substrate 30 corresponding to the subdials are exposed.

That is, the subdials have a light-colored design and the main dial portion other than the subdials has a dark-colored design. The light color is a color that easily transmits the color of the solar cell 90 disposed under the dial 50 and examples thereof include transparent and white. The dark color is a color that does not easily transmit the color of the solar cell 90 disposed under the dial 50 and examples thereof include black and purple.

The dial ring 40 includes a ring-shaped annular portion 41 overlapping an outer peripheral edge of the substrate 30 and a plurality of hour marks 43 provided inside the annular portion 41. As shown in FIG. 3, each hour mark 43 which is a decorative member is implanted and fixed to the annular portion 41 by two fixing pins 43*a*.

The outer periphery of the dial ring 40 is surrounded by a glass edge 60. A windshield 63 is fitted in the glass edge 60. The glass edge 60 is a lid and is combined with a body 65 made of hard metal such as stainless steel. The body 65 is a case of the watch 100 and receives therein the movement 77, the solar cell 90, the transflective plate 20, the dial 50, and the like.

Figure 4:
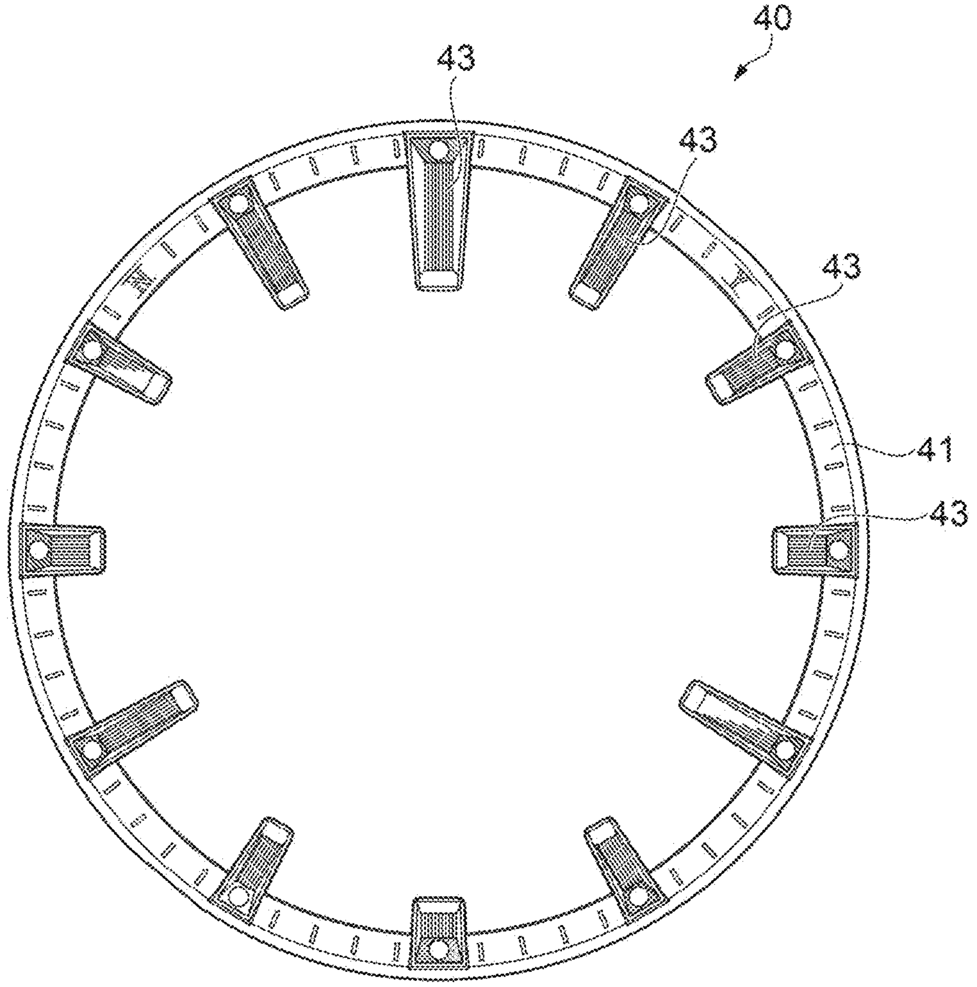
FIG. 4 is a plan view of a dial ring.

FIG. 4 is a plan view of the dial ring.

As shown in FIG. 4, the hour marks 43 are separately provided one by one at the time positions from 1:00 to 12:00. Each hour mark 43 has a rectangular shape and protrudes inward from the annular portion 41. Minute marks are printed on the annular portion 41.

Figure 5:
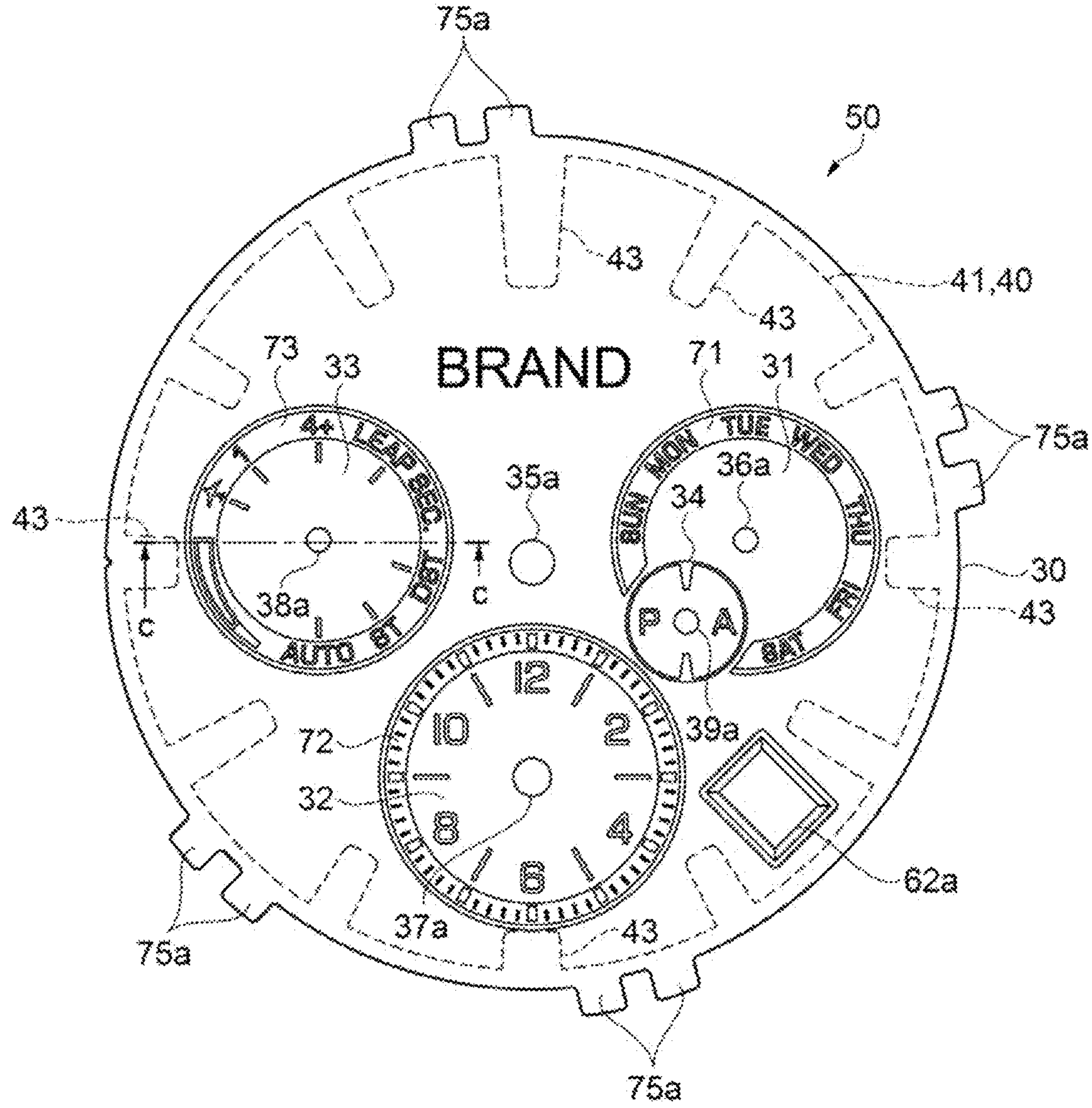
FIG. 5 is a plan view of the dial.
Figure 6:
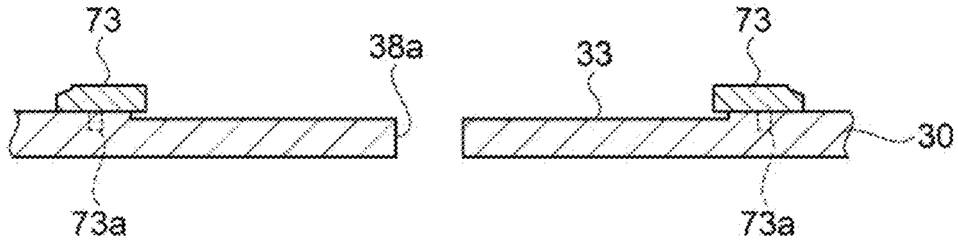
FIG. 6 is a cross-sectional view taken along line c-c of FIG. 5.

FIG. 5 is a plan view of the dial. FIG. 6 is a cross-sectional view taken along line c-c of FIG. 5.

As shown in FIG. 5, the substrate 30 of the dial 50 is provided with a plurality of through holes for passing the shafts of hands therethrough. Specifically, a hole 35*a* for passing the shafts of the second hand 2, the minute hand 3, and the hour hand 4 therethrough is provided in the center of the substrate 30. A hole 36*a* for passing the shaft of the day hand 5 therethrough is provided in the center of the subdial 31. Similarly, a hole 37*a* for passing the shafts of the minute hand 6 and the hour hand 7 therethrough is provided in the center of the subdial 32 and a hole 38*a* for passing the shaft of the indicator hand 8 therethrough is provided in the center of the subdial 33. A hole 39*a* for passing the shaft of the AMPM hand 9 therethrough is provided in the center of the subdial 34. The substrate 30 is also provided with a rectangular hole 62*a* corresponding to the date window 62.

A subdial ring 73 is provided on an outer peripheral edge of the subdial 33. As shown in FIG. 6, the subdial ring 73 is a ring-shaped member and is implanted and fixed to the substrate 30 by a fixing pin 73*a*. The surface of the subdial ring 73 is printed with letters and marks for displaying the indicator. The presence of the subdial ring 73 allows the subdial 33 to be viewed three-dimensionally. Also, the surface position of the subdial 33 is stepped down from a reference surface position of the substrate 30. This is to make the subdial 33 including the subdial ring 73 look more three-dimensional.

Similarly, a subdial ring 71 is provided on an outer peripheral edge of the subdial 31 and a subdial ring 72 is provided on an outer peripheral edge of the subdial 32. Letters indicating the days of the week are printed on the surface of the subdial ring 71. Minute marks and hour marks are printed on the surface of the subdial ring 72.

A plurality of positioning protrusions 75*a* are provided on the outer periphery of the substrate 30. The protrusions 75*a* are provided in pairs of two. The pairs of protrusions 75*a* are protrusions for positioning the dial 50 in a rotational direction, which is positioned by fitting each positioning pin (not shown) provided on the movement 77 between a corresponding pair of protrusions. The pairs of protrusions 75*a* are provided at four locations near 12:00, 2:30, 5:30, and 7:30.

In FIG. 5, the outer shape of the dial ring 40 is shown by a dotted line. The inner peripheral circle of the annular portion 41 of the dial ring 40 is set slightly smaller than the outer peripheral circle of the substrate 30 of the dial 50. That is, the outer peripheral edge of the dial 50 is covered with a part of the annular portion 41 of the dial ring 40.

Configuration of Transflective Plate

Figure 7:
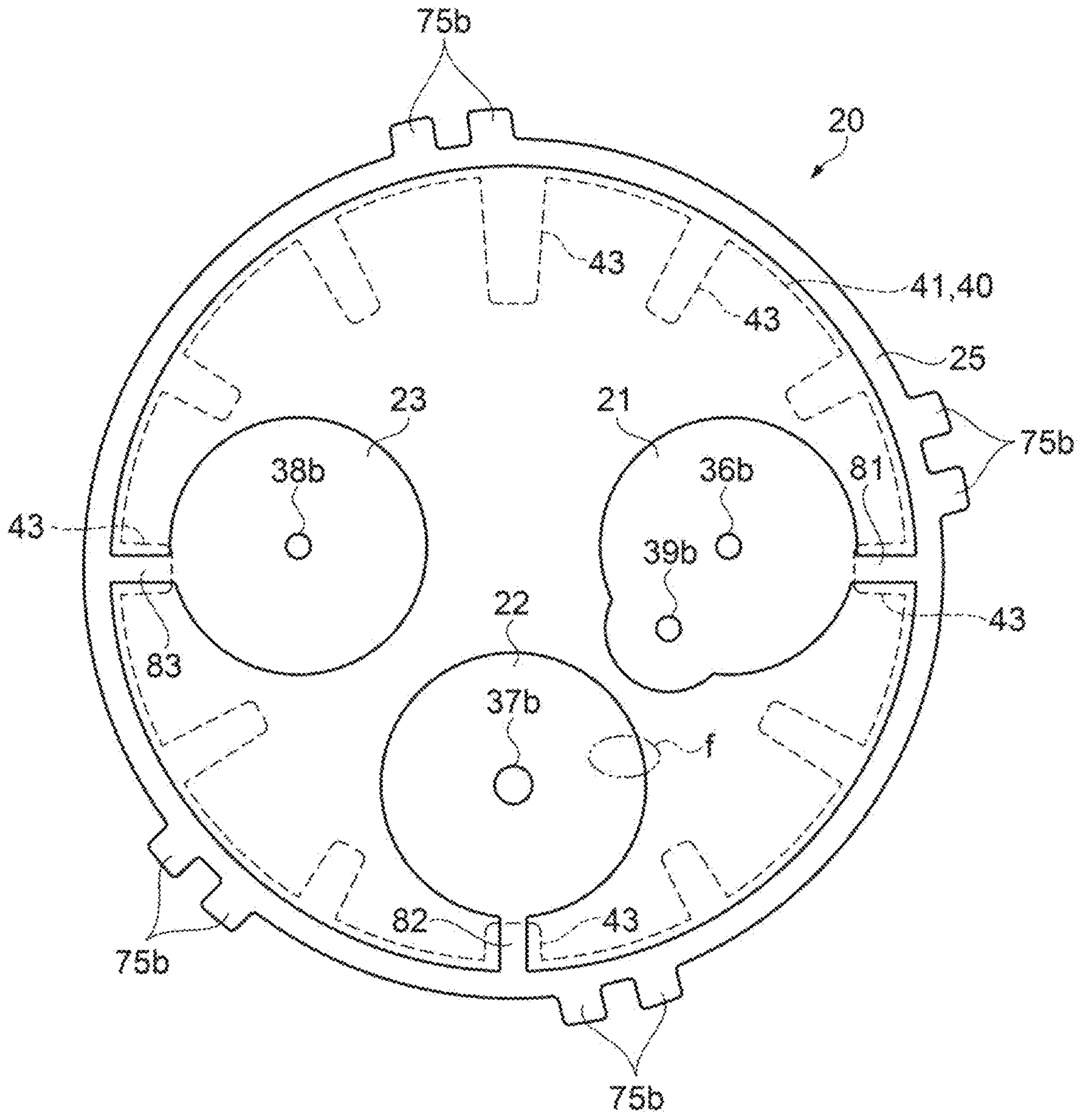
FIG. 7 is a plan view of a transflective plate.

FIG. 7 is a plan view of the transflective plate.

As shown in FIG. 7, the transflective plate 20 includes a ring-shaped annular portion 25 overlapping the annular portion 41 of the dial ring 40, three island portions 21, 22, and 23 provided inside the annular portion 25, and coupling portions 81, 82, and 83 coupling the annular portion 25 and the island portions. Each of the island portions 21, 22, and 23 corresponds to a first region. The annular portion 25 corresponds to a second region.

As shown in FIG. 2, the island portion 21 is selectively provided at a portion overlapping the subdials 31 and 34 of the dial 50. Similarly, the island portion 22 is selectively provided at a portion overlapping the subdial 32 of the dial 50. The island portion 23 is selectively provided at a portion overlapping the subdial 33 of the dial 50.

The island portions 21, 22, and 23 are provided with through holes for passing the shafts of hands therethrough, similar to the substrate 30 of the dial 50. The island portion 21 is provided with holes 36*b* and 39*b* corresponding respectively to the holes 36*a* and 39*a* of the dial 50. The island portion 22 is provided with a hole 37*b* corresponding to the hole 37*a* of the dial 50. The island portion 23 is provided with a hole 38*b* corresponding to the hole 38*a* of the dial 50. The solar cell 90 is also provided with through holes for passing the shafts of hands therethrough. The solar cell 90 is provided with holes 35*c*, 36*c*, 37*c*, 38*c*, and 39*c* corresponding to the holes 35*a*, 36*a*, 37*a*, 38*a*, and 39*a* of the dial 50. The solar cell 90 is also provided with a rectangular hole 62*c* corresponding to the rectangular hole 62*a* of the dial 50.

Reference is now made back to FIG. 7. In FIG. 7, the outer shape of the dial ring 40 is shown by a dotted line.

The coupling portion 81 is a rod-shaped coupling portion that couples the island portion 21 and the annular portion 25 and is provided at a position overlapping an hour mark 43 at the 3 o'clock position on the dial ring 40. Similarly, the coupling portion 82 that couples the island portion 22 and the annular portion 25 is provided at a portion overlapping an hour mark 43 at the 6 o'clock position on the dial ring 40. The coupling portion 83 that couples the island portion 23 and the annular portion 25 is provided at a position overlapping an hour mark 43 at the 9 o'clock position on the dial ring 40. That is, the coupling portions 81, 82, and 83 are selectively provided at positions overlapping hour marks 43 which are decorative members. Thus, when the watch 100 is seen from the front, the coupling portions 81, 82, and 83 are hidden by the decorative members. The decorative members are not limited to the hour marks 43 and may be any portions provided at the dial 50, for example, design portions such as an abbreviation, a ring, a logo, or a star shape.

A plurality of positioning protrusions 75*b* protruding outward are also provided on the outer periphery of the annular portion 25, similar to the dial 50. The protrusions 75*b* are provided in pairs of two at positions overlapping the protrusions 75*a* of the dial 50. The pairs of protrusions 75*b* are provided at four locations near 12:00, 2:30, 5:30, and 7:30, similar to the pairs of protrusions 75*a* of the dial 50. Each of the protrusions 75*b* corresponds to a fifth region.

That is, the transflective plate 20 includes the island portions 21, 22, and 23 which are first regions selectively provided at portions overlapping the subdials 31, 32, and 33, the annular portion 25 which is a second region provided at a portion overlapping the outer periphery of the dial 50, and the coupling portions 81, 82, and 83 which are third regions coupling the first regions and the second region, and the coupling portions 81, 82, and 83 are selectively provided at portions overlapping the hour marks 43 which are decorative members. The transflective plate 20 further includes the protrusions 75*b* which are fifth regions protruding outward from the annular portion 25.

In a preferred example, the material of the transflective plate 20 is a reflective polarizing plate having both light transmission and light reflection functions. The transflective plate 20 is formed by cutting out the shape of FIG. 7 from a large sheet-like reflective polarizing plate using a blade such as a Thomson type blade.

Figure 8:
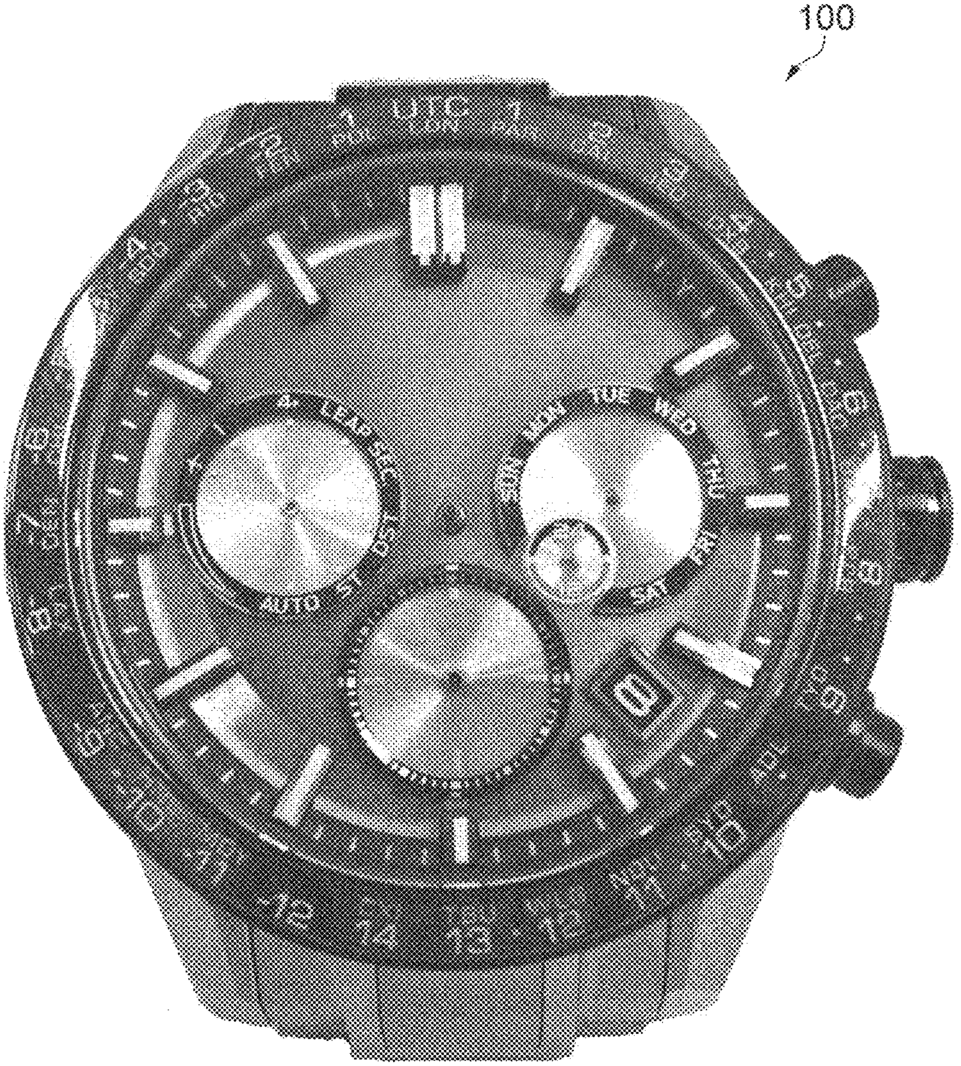
FIG. 8 is a photographic view of an example of the watch.

The reflective polarizing plate has a function of transmitting a required amount of light to allow the solar cell 90 (FIG. 2) to generate electricity and a function of reflecting a certain amount of light to brighten the dial 50. Examples of reflective polarizing plates include a Dual Brightness Enhancement Film (DBEF) (trade name) manufactured by Sumitomo 3M. Reflective polarizing plates include those exhibiting a glossy silver color (silver color) in reflected light and those exhibiting a gold color, and when a reflective polarizing plate exhibiting a silver color is used, a whitish metallic color appears and becomes visible. In FIG. 8 which will be described later, a reflective polarizing plate exhibiting a silver color is used as a preferred example, but any of the two colors may be appropriately selected according to the design or the like.

The material of the transflective plate 20 is not limited to a reflective polarizing plate and may be a thin plate material having both light transmission and light reflection functions. For example, a brightness-improving film such as a prism sheet or a transparent resin sheet or resin plate provided with a light-transmissive metal thin film or paint thin film may be used.

Alternatively, a thin plate having a plurality of small holes may be used.

Assemblability of Dial

Reference is now made back to FIG. 2. When the dial 50, the dial ring 40, and the like are assembled, the transflective plate 20, the dial 50, and the dial ring 40 are superposed and set on the solar cell 90 in this order as shown FIG. 2 with the solar cell 90 incorporated on the movement 77 (in FIG. 3).

Here, because the three island portions 21, 22, and 23 corresponding to the subdials are integrated with the annular portion 25, the transflective plate 20 can be set on the solar cell 90 in one operation, thus improving assemblability. Further, because the coupling portions 81, 82, and 83 are provided at positions overlapping the hour marks 43, the coupling portions 81, 82, and 83 are not seen. Thus, the transflective plate 20 does not appear on the outside and does not impair the appearance.

FIG. 8 is a photographic view of an example of a watch with the transflective plate.

FIG. 8 shows a photograph of a prototype (example) watch 100 including the transflective plate 20 described above. The transflective plate 20 is one exhibiting a silver color and the dial 50 is a light-colored one that has been coated with a white translucent coating.

As shown in FIG. 8, the appearance of the watch 100 is such that a base portion of the dial 50 exhibits a dark purple color and the three subdials thereof are seen in a metallic glossy silver color. The dark purple color of the dial 50 is due to the color tone of the solar cell 90. The silver color of the subdials is mainly due to dispersion and diffusion of external light reflected by the transflective plate 20. Similar to the dial 50, the subdials also reflect light from the solar cell 90, but most of the reflected light is reflected by the transflective plate 20 and incident on the solar cell 90 again and thus the effect of the color tone of the solar cell 90 is slight.

As described above, the watch 100 including the transflective plate 20 can make the subdials stand out relative to the base portion of the dial 50, thus improving the design. The transflective plate 20 may also be provided at positions other than the subdials. For example, if a star-shaped transflective plate is provided in the base portion of the dial 50, a silvery star shape can be exhibited.

As described above, the watch 100 of the first embodiment can achieve the following advantages.

The watch 100 is a solar watch including the dial 50 on the solar cell 90, wherein an hour mark 43 which is a decorative member is provided at the dial 50, the dial 50 includes the subdial 31, 32, or 33, the transflective plate 20 is provided between the solar cell 90 and the dial 50, the transflective plate 20 includes the island portion 21, 22, or 23 as a first region selectively provided at a portion overlapping the subdial 31, 32, or 33, the annular portion 25 as a second region provided at a portion overlapping the outer periphery of the dial 50, and the coupling portion 81, 82, or 83 as a third region coupling the first region and the second region, and the coupling portion 81, 82, or 83 is selectively provided at a portion overlapping the hour mark 43 which is a decorative member.

According to this, the transflective plate 20 is disposed at positions overlapping the subdials 31, 32, and 33 of the dial in which the subdials 31, 32, and 33 have a light-colored design and the main dial portion other than the subdials has a dark-colored design, whereby it is possible to prevent the subdials from transmitting the color of the solar cell 90. Assemblability is improved because the transflective plate 20 is integrated with the first regions selectively disposed at the portions of the subdials 31, 32, and 33, the second region on the outer periphery, and the third regions coupling the first and second regions. Further, because the coupling portions 81, 82, and 83 which are third regions are selectively provided at positions overlapping the hour marks 43 which are decorative members, the coupling portions 81, 82, and 83 do not appear on the outside and do not impair the appearance. Furthermore, because the transflective plate 20 is not disposed at a portion overlapping the main dial portion other than the subdials, the light transmission in the main dial portion is higher than in the subdial portions and a large amount of external light is incident on the solar cell 90 to increase the power generation efficiency.

Thus, it is possible to provide the watch 100 including the dial 50 with excellent assemblability and light transmission and improved design.

The decorative members are abbreviations, rings, or logos including the hour marks 43.

According to this, it is possible to provide third regions (coupling portions) at positions overlapping these decorative members according to the design.

The transflective plate 20 further has the protrusions 75*b* as fifth regions protruding outward from the annular portion 25 which is the second region. The protrusions 75*b* are provided at positions overlapping the protrusions 75*a* of the dial 50.

According to this, the transflective plate 20 and the dial 50 can be properly positioned.

Second Embodiment

Different Configuration of Transflective Plate

Figure 9:
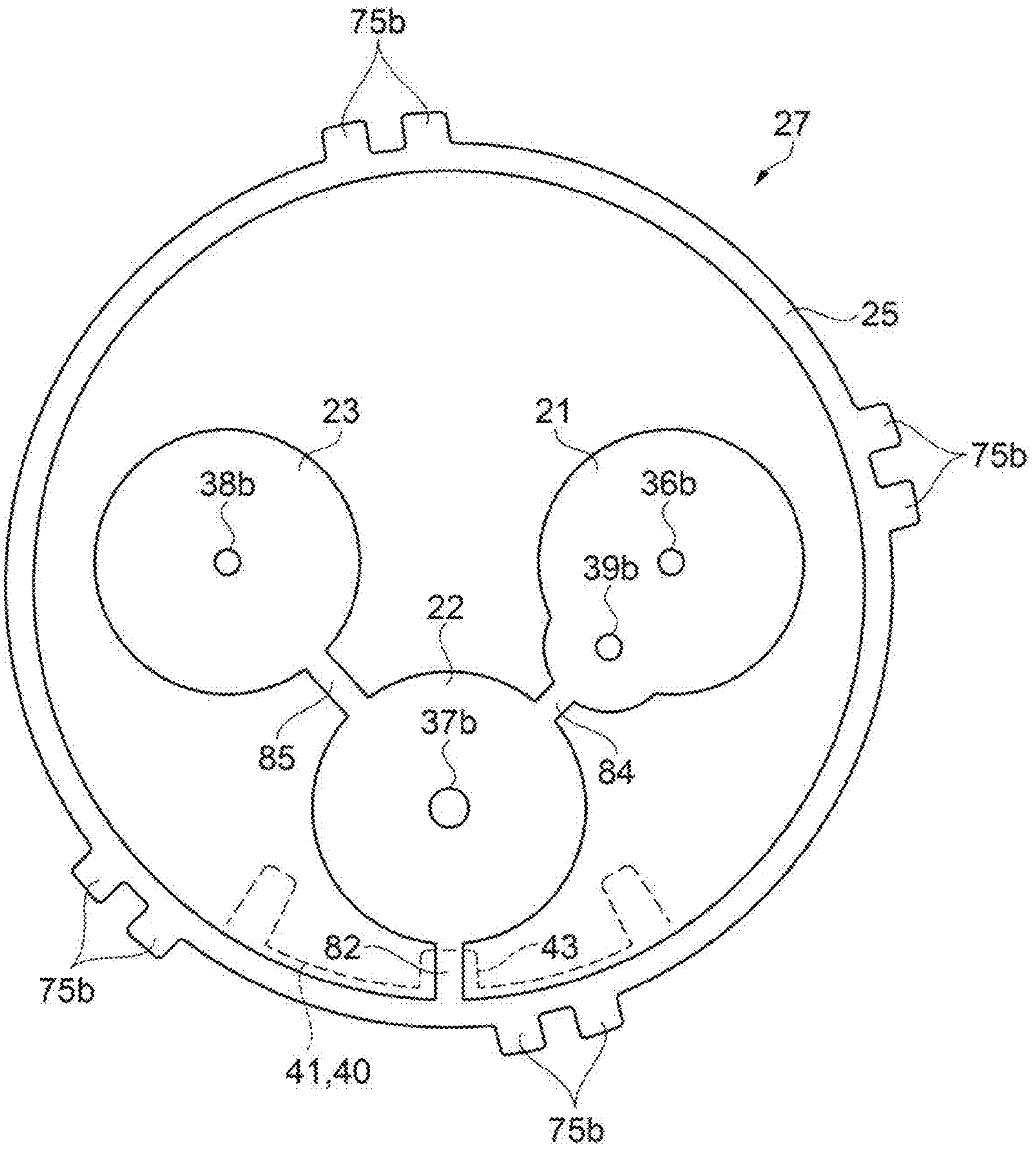
FIG. 9 is a plan view of a transflective plate according to a second embodiment.

FIG. 9 is a plan view of a transflective plate according to a second embodiment and corresponds to FIG. 7.

In the above embodiment, it has been described that the three island portions 21, 22, and 23 of the transflective plate 20 are each coupled to the annular portion 25, but the present disclosure is not limited to this configuration and it suffices if they are coupled at a position overlapping a decorative member. For example, in a transflective plate 27 of the second embodiment, island portions 21 and 23 are not coupled to an annular portion 25 but are coupled to an island portion 22. In the following, the same components as in the above embodiment are given the same reference numerals and the redundant description is omitted.

As shown in FIG. 9, in the transflective plate 27, the annular portion 25 and the island portion 22 are coupled by a coupling portion 82, while the island portions 21 and 23 are not coupled to the annular portion 25.

The island portion 21 is coupled to the island portion 22 by a coupling portion 84 which is a fourth region. Because the island portions 21 and 22 are close to each other and the coupling portion 84 crosses the subdial ring 72 (in FIG. 2), its part overlapping the ring does not appear on the outside. The island portion 23 is coupled to the island portion 22 by a coupling portion 85 which is a fourth region. Because the island portions 23 and 22 are close to each other and the coupling portion 85 crosses the subdial rings 72 and 73 (FIG. 2), its part overlapping the rings does not appear on the outside.

Because the island portions 21 and 23 are coupled to and integrated with the annular portion 25 through the island portion 22, the transflective plate 27 can be handled as one component, thus improving assemblability.

That is, the transflective plate 27 includes the island portions 21, 22, and 23 as first regions and further includes the coupling portions 84 and 85 as fourth regions coupling the first regions.

Figure 10:
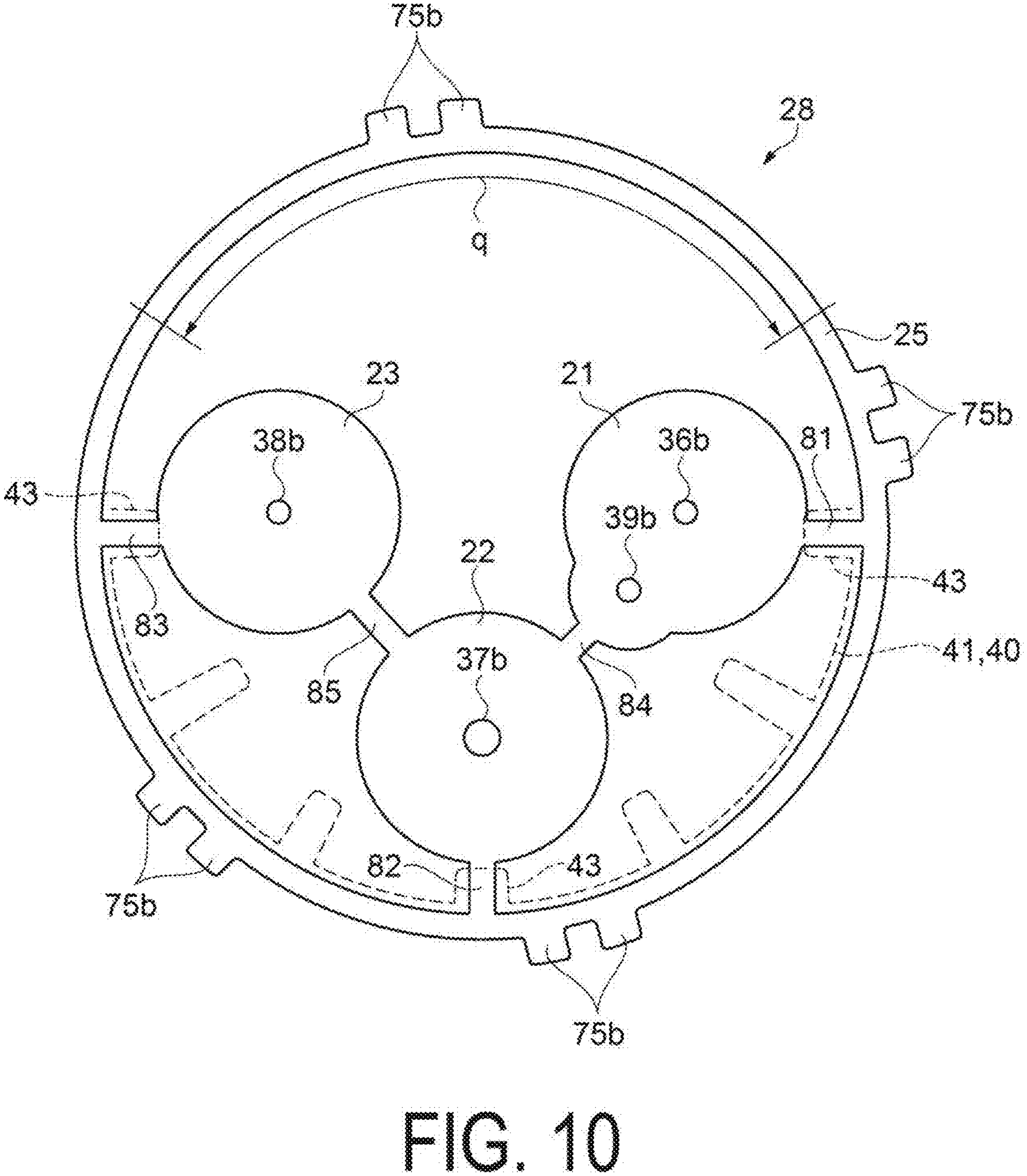
FIG. 10 is a plan view of a different form of transflective plate.

FIG. 10 is a plan view of a different form of transflective plate and corresponds to FIG. 9.

In the different form of transflective plate 28, each of three island portions 21, 22, and 23 includes a coupling portion coupled to an annular portion 25 and a coupling portion coupled to another island portion. Specifically, the island portion 21 includes a coupling portion 81 coupled to the annular portion 25 in addition to a coupling portion 84 coupled to the island portion 22. The island portion 23 includes a coupling portion 83 coupled to the annular portion 25 in addition to a coupling portion 85 coupled to the island portion 22. Other features than these are similar to those of the transflective plate 20. Thus, the annular portion 25 and the three island portions 21, 22, and 23 are more closely coupled, such that the integrity of the parts is improved and the handling during assembly is facilitated.

The transflective plate 28 may also have a configuration in which a part of the annular portion 25 is cut out. Specifically, in FIG. 10, the annular portion 25 in a range indicated by an arrow q may be eliminated. Even if this part is omitted, the annular portion 25 and the island portions 21 and 23 are securely coupled by the coupling portions 81 and 83, such that the integrity of the parts is ensured and the assemblability is not impaired. Also, because there are three pairs of positioning protrusions 75*b*, the positioning and rotation-preventing functions are sufficient. With this configuration, the size of the transflective plate 28 can be reduced, such that the number of transflective plates 28 cut out from a large sheet can be increased and the cost of parts can be reduced.

As described above, the watch 100 of the second embodiment can achieve the following advantages in addition to the advantages of the above embodiments.

The transflective plate 27 or 28 includes the island portions 21, 22 and 23 as first regions and further includes the coupling portions 84 and 85 as fourth regions that couple the first regions. The transflective plate 28 also includes the coupling portions 81 and 83 coupled to the annular portion 25 in addition to the coupling portions 84 and 85.

According to this, the annular portion 25 and the three island portions 21, 22, and 23 are more closely coupled, such that the integrity of the parts is improved and the handling during assembly is facilitated.

Thus, it is possible to provide the watch 100 including the dial 50 with excellent assemblability and light transmission and improved design.

Third Embodiment

Different Configuration of Dial

Figure 11:
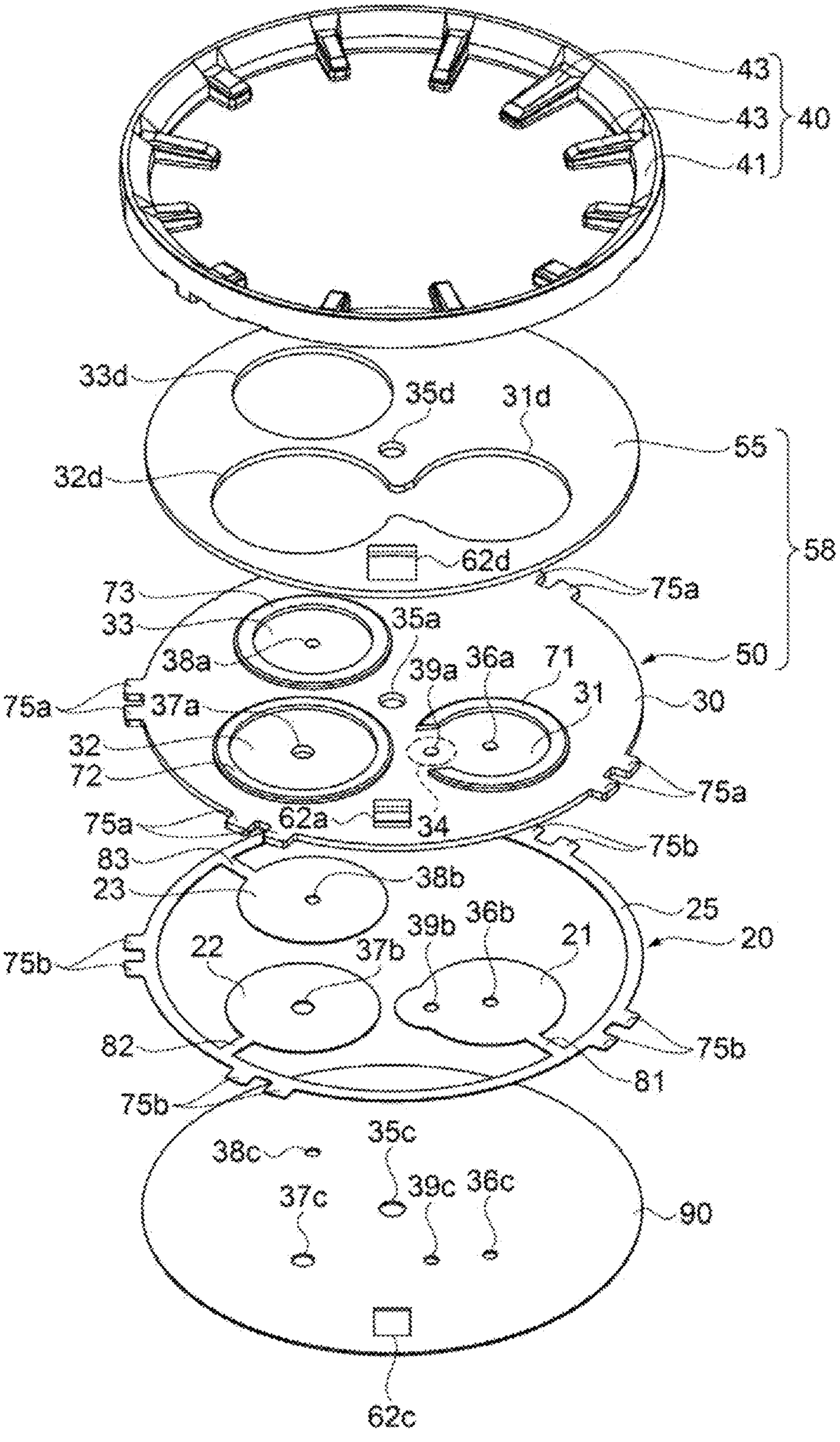
FIG. 11 is an exploded perspective view of a dial according to a third embodiment.

FIG. 11 is an exploded perspective view of a dial according to a third embodiment and corresponds to FIG. 2.

In the above embodiments, it has been described that the dial 50 has a one-piece structure, but the present disclosure is not limited to this structure and may have, for example, a two-piece structure. The dial 58 of the third embodiment differs from that of the first embodiment in that it has a two-piece structure with the dial 50 provided as a first dial and a second dial 55 superposed thereon. In the following, the same components as in the above embodiment are given the same reference numerals and the redundant description is omitted.

As shown in FIG. 11, the dial 58 of the third embodiment has a configuration in which the second dial 55 is superposed on the dial 50.

The second dial 55 is a transparent plate-like member molded from a transparent resin, similar to the substrate 30 of the dial 50, and has openings 31*d*, 32*d*, and 33*d* corresponding to the three subdials. The second dial 55 is also provided with a hole 35*d* corresponding to the hole 35*a* of the dial 50 and a rectangular hole 62*d* corresponding to the rectangular hole 62*a* of the dial 50.

The opening 31*d* corresponds to the subdial 31 (in FIG. 2) and is large enough to expose up to the subdial ring 71. The opening 32*d* corresponds to the subdial 32 and is large enough to expose up to the subdial ring 72. The opening 31*d* and the opening 32*d* are coupled in a figure eight shape to form one opening.

The opening 33*d* corresponds to the subdial 33 and is large enough to expose up to the subdial ring 73.

In a preferred example, the second dial 55 is colored with a transparent color.

That is, the dial 58 includes the dial 50 provided as a first dial and the second dial 55, the second dial 55 is superposed on the dial 50 and has the openings 31*d*, 32*d*, and 33*d*, the dial 50 includes the subdials 31, 32, and 33 at positions overlapping the openings 31*d*, 32*d*, and 33*d*, and the transflective plate 20 is disposed between the solar cell 90 and the dial 50.

As described above, the watch 100 of the third embodiment can achieve the following advantages in addition to the advantages of the above embodiments.

The dial 58 includes the dial 50 which is a first dial and the second dial 55, the second dial 55 is superposed on the dial 50 and has openings 31*d*, 32*d* and 33*d*, the dial 50 includes the subdials 31, 32, and 33 at positions overlapping the openings 31*d*, 32*d*, and 33*d*, and the transflective plate 20 is disposed between the solar cell 90 and the dial 50.

According to this, the second dial 55 is provided, whereby the appearance of the dial 58 can be made more three-dimensional. Further, the second dial 55 is colored with a transparent color, whereby more diverse color expression can be performed.

Thus, it is possible to provide the watch 100 including the dial 58 with excellent assemblability and light transmission and improved design.

Fourth Embodiment

Different Configuration of Transflective Plate

Figure 12:
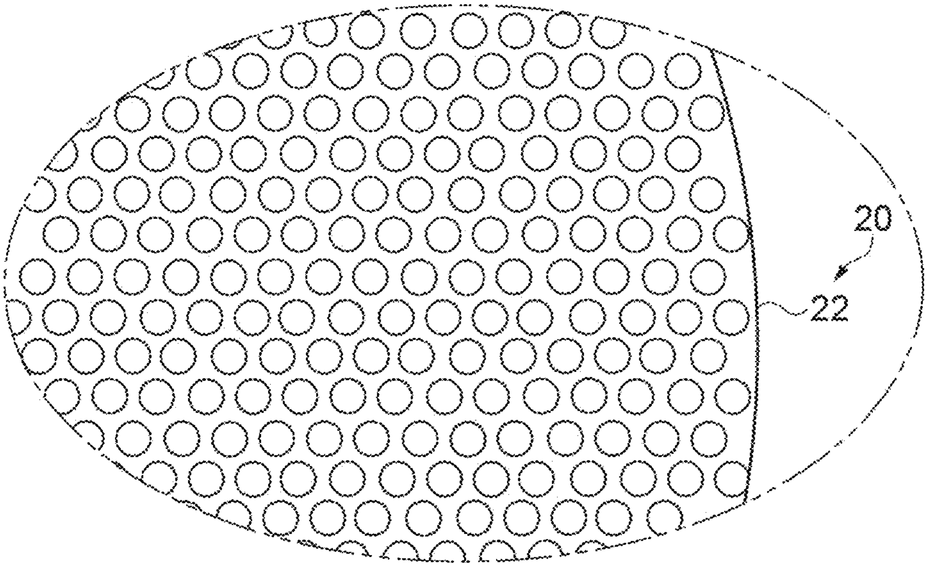
FIG. 12 is a detailed view of a transflective plate according to a fourth embodiment.

FIG. 12 is a detailed view of a transflective plate according to a fourth embodiment and is an enlarged view of a portion f in FIG. 7.

The three island portions 21, 22, and 23 in FIG. 7 may be processed to increase the light transmission. FIG. 12 is an enlarged view of the portion f of the island portion 22 of FIG. 7. As shown in FIG. 12, the island portion 22 is provided with a plurality of holes. In a preferred example, these holes are formed by laser processing with a hole diameter of about 100 μm or more and 200 μm or less. The processing method is not limited to laser processing and may be any method capable of forming similar holes. The other island portions 21 and 23 are each similarly provided with a plurality of holes.

That is, the island portions 21, 22, and 23 which are first regions of the transflective plate 20 are each provided with a plurality of holes.

As described above, the watch 100 of the present embodiment can achieve the following advantages in addition to the advantages of the above embodiments.

A plurality of holes are provided in each of the island portions 21, 22, and 23 which are first regions of the transflective plate 20. Because the holes are very small, they are difficult to see, do not impair the design, and have almost no effect on the color tone of the solar cell 90.

According to this, the light transmission in the first regions can be increased. Accordingly, the power generation efficiency of the solar cell 90 can be increased.

Thus, it is possible to provide the watch 100 including the dial 50 with excellent assemblability and light transmission and improved design.

What is claimed is:

1. A solar watch comprising a dial at a solar cell, wherein a decorative member is provided at the dial,
the dial includes a subdial,
a transflective plate is provided between the solar cell and the dial,
the transflective plate has a first region selectively provided at a portion overlapping the subdial, a second region provided at a portion overlapping an outer periphery of the dial, and a third region coupling the first region and the second region, and
the third region is selectively provided at a portion overlapping the decorative member.

2. The solar watch according to claim 1, wherein
the dial includes a first dial and a second dial,
the second dial is superposed on the first dial and has an opening,
the first dial includes the subdial at a portion overlapping the opening, and
the transflective plate is disposed between the solar cell and the first dial.

3. The solar watch according to claim 1, wherein
the decorative member is an abbreviation, a ring, or a logo.

4. The solar watch according to claim 1, wherein
the transflective plate includes a plurality of first regions and further has a fourth region that couples the first regions to each other.

5. The solar watch according to claim 1, wherein
the transflective plate further has a fifth region protruding outward from the second region.

6. The solar watch according to claim 1, wherein
a plurality of holes are provided in the first region of the transflective plate.

7. The solar watch according to claim 1, wherein,
in the dial, the subdial is light-colored and a main dial portion other than the subdial is dark-colored.

* * * * *